United States Patent Office 3,532,829
Patented Oct. 6, 1970

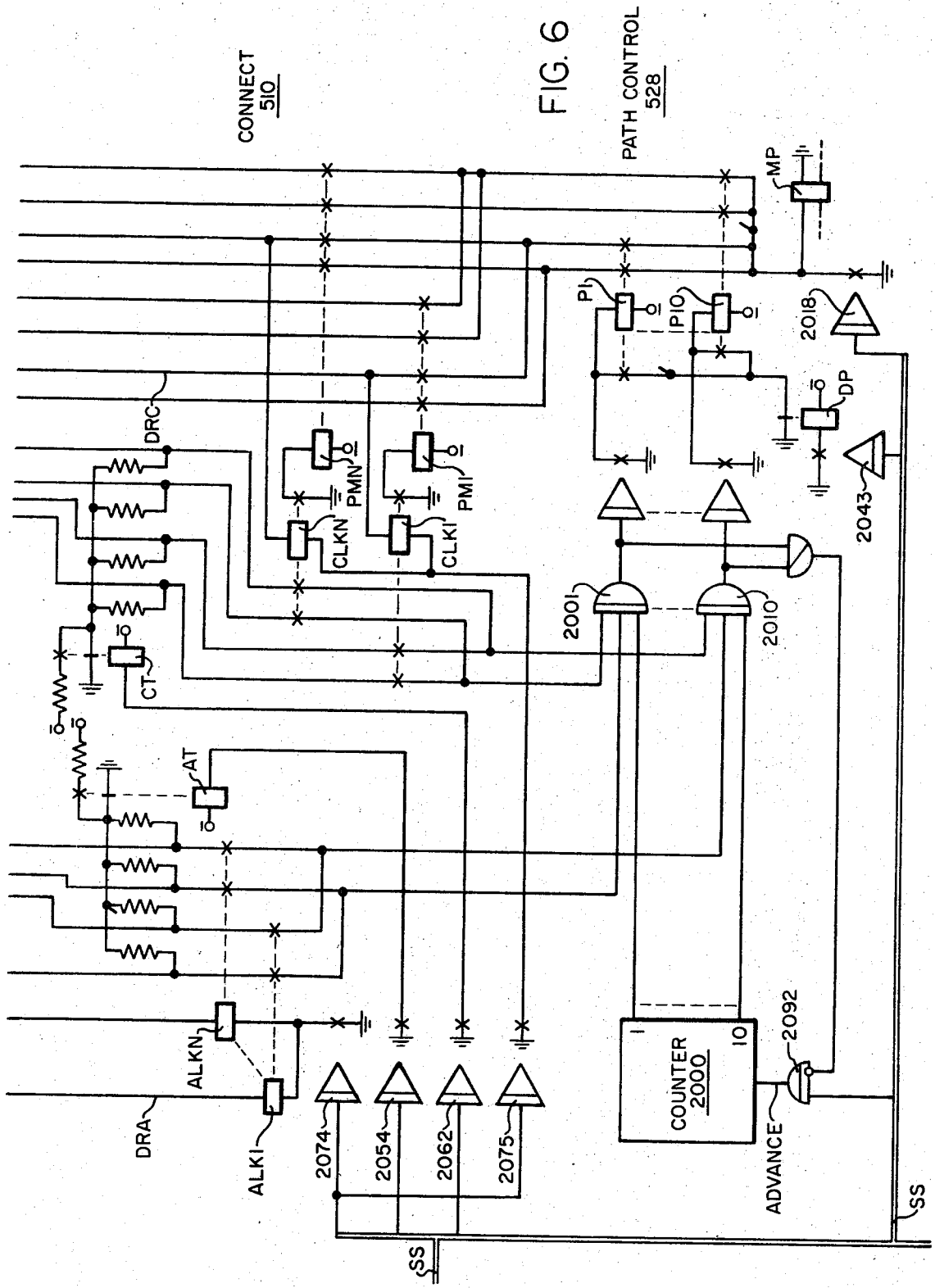

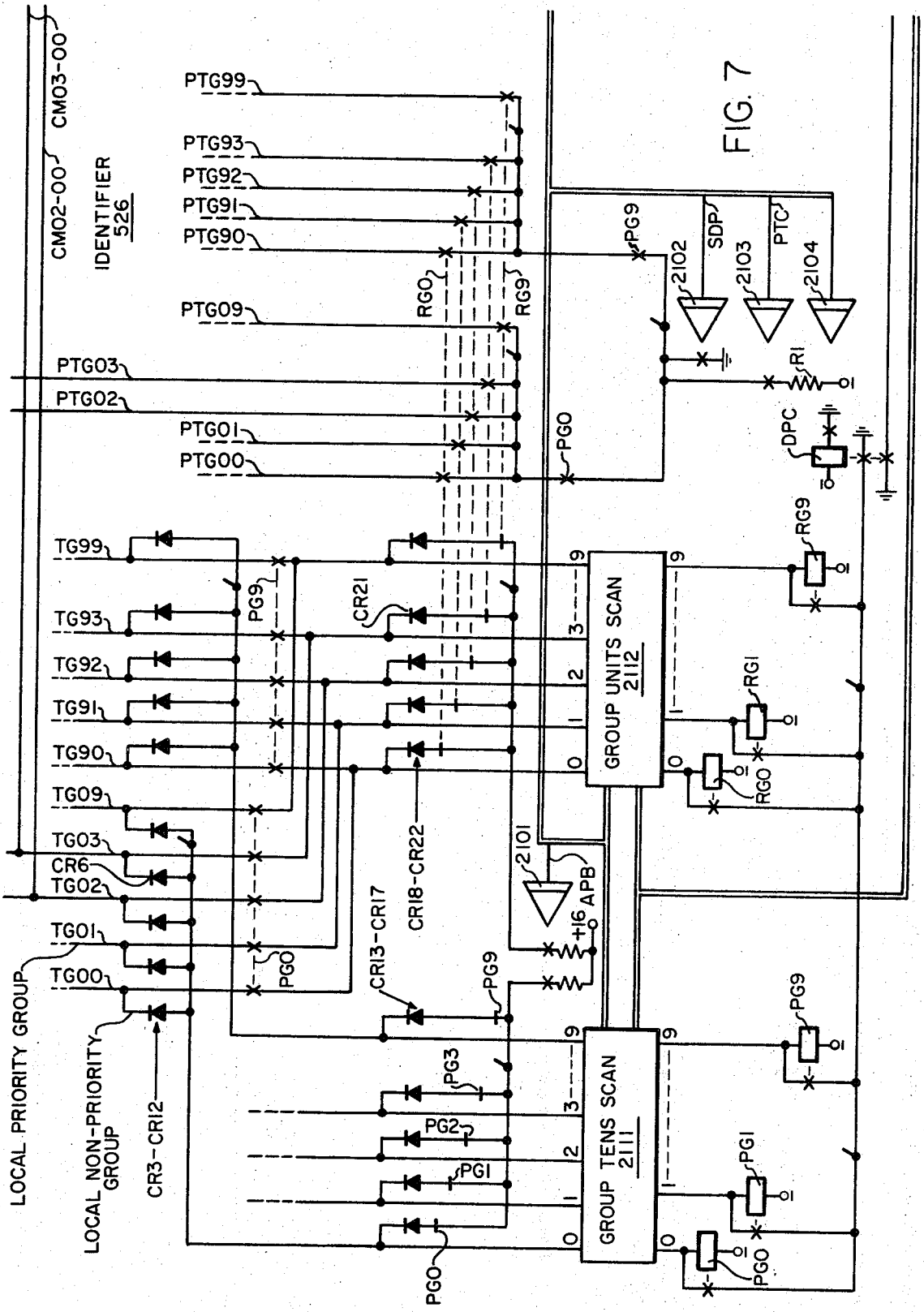

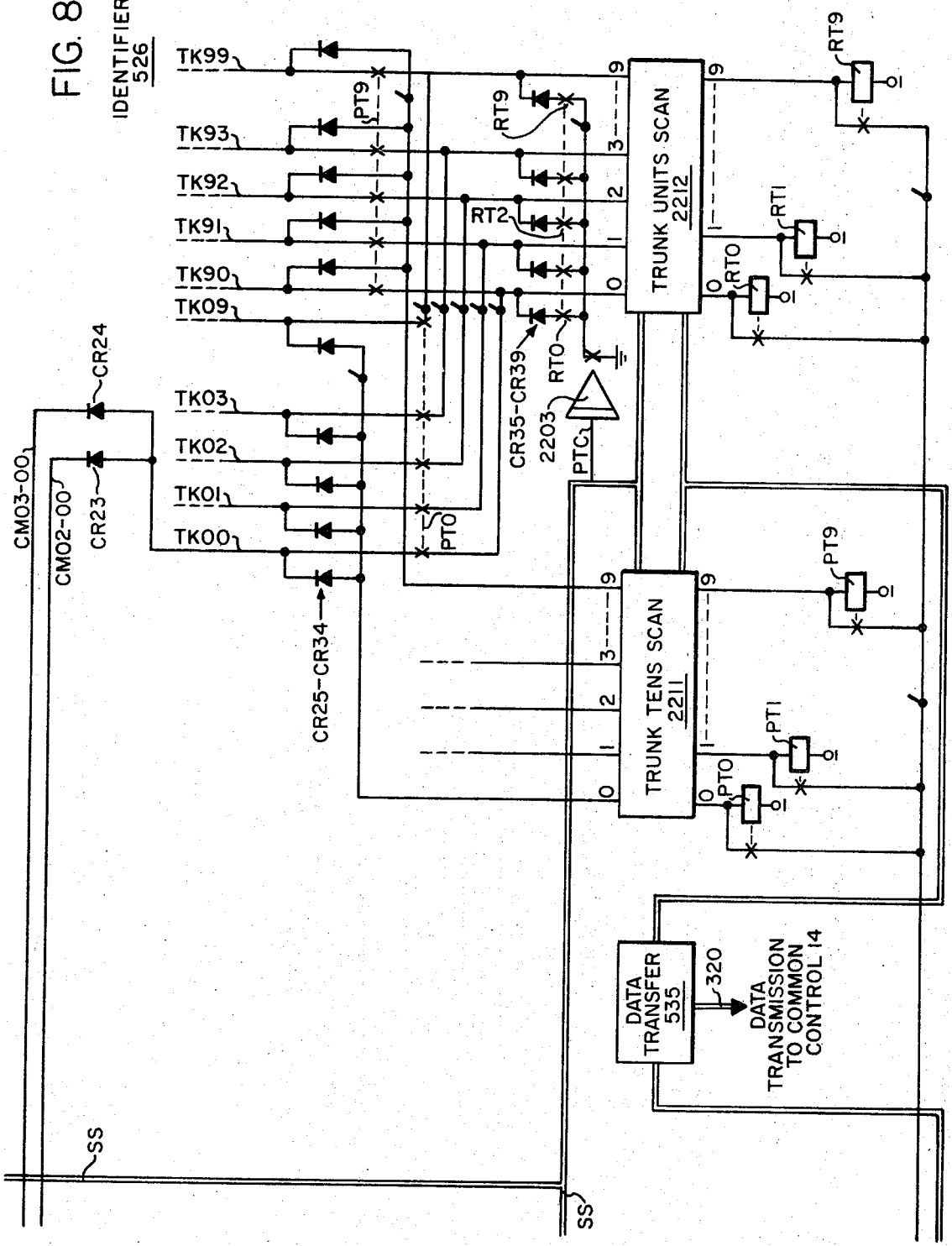

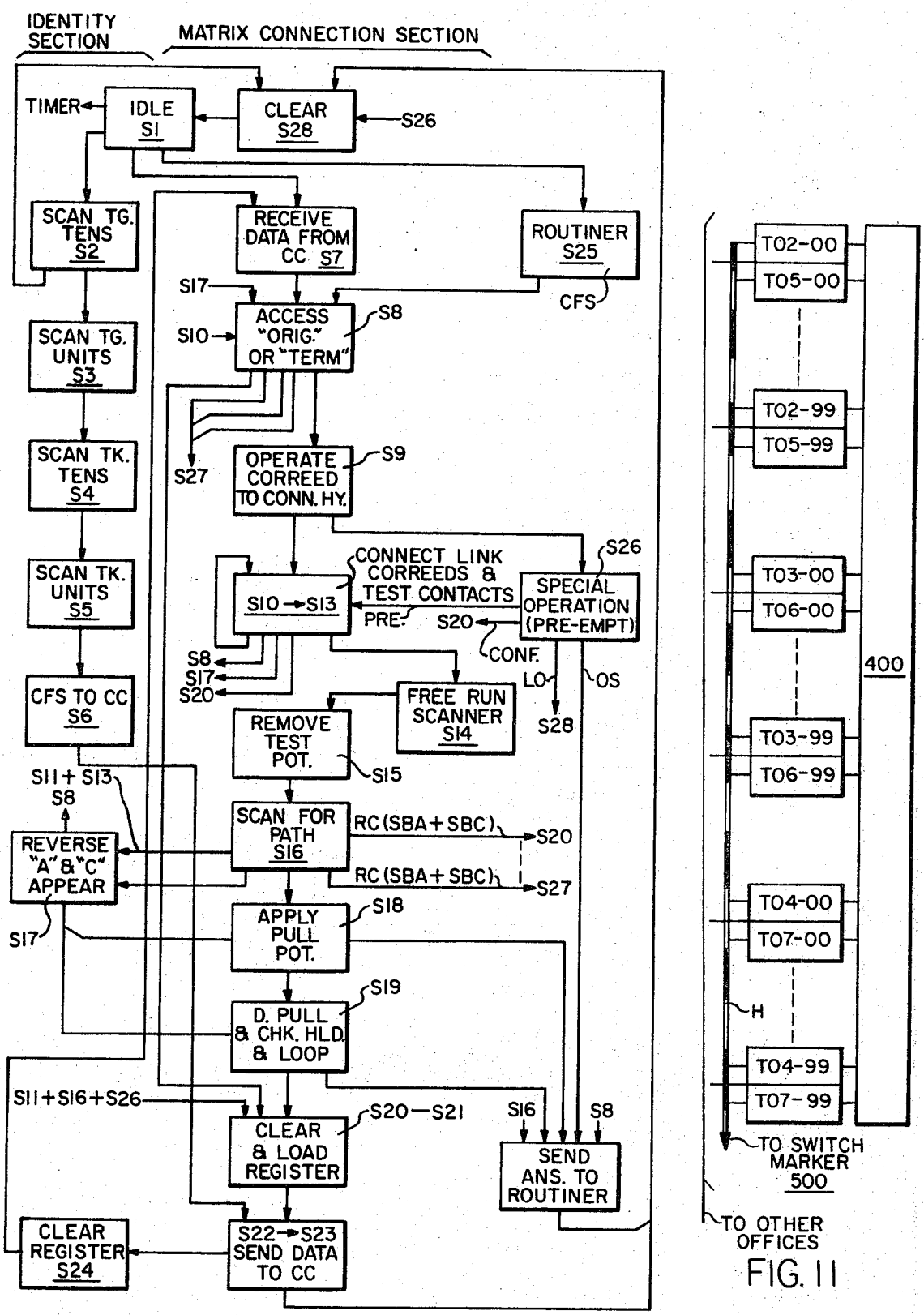

3,532,829
PRIORITY TRAFFIC CONTROL APPARATUS FOR PREFERENTIAL ACCESS TO COMMON CONTROL EQUIPMENT
William R. Wedmore and William C. Miller, Glen Ellyn, Ill., assignors to Automatic Electric Laboratories, Inc., Northlake, Ill., a corporation of Delaware
Filed Dec. 4, 1967, Ser. No. 687,723
Int. Cl. H04m 3/38
U.S. Cl. 179—18                    11 Claims

ABSTRACT OF THE DISCLOSURE

A communication switching system employs apparatus for providing priority service through each switching center of the system for calls which have priority grade service at their local originating switching center. The apparatus comprises interoffice trunks which serve both priority and non-priority interoffice calls and which include signal receiving equipment for indicating to their associated switch marker the type of call that is requesting service. For use as an outgoing trunk, the interoffice trunk also comprises signal transmitting equipment for indicating to a forward switching center that a priority call is requesting service. The terminating units of the switching matrix which include line circuits, trunk circuits and register-sender junctor circuits, are graded to the scanner of the switch marker so that preferential service is given first to local priority calls, then to interoffice priority calls and last to non-priority calls.

CROSS REFERENCES TO RELATED APPLICATIONS

U.S. Pat. 3,328,534 to R. J. Murphy et al. for a Communication Switching System discloses the type of switching system in which the present invention could be used. The identifier portion of the switch marker in the Murphy et al. patent, as shown in FIGS. 21 and 22 thereof, form the basis for co-pending United States patent application Ser. No. 463,587, filed June 14, 1965 now Pat. No. 3,413,421, for Identifying Arrangement for Communication Switching Systems by A. S. Cochran and F. B. Sikorski. A similar identifier and other portions of the switch marker of the Murphy et al. system are incorporated herein to aid in the explanation of the present invention. Accordingly, similar drawings and reference characters as found in Murphy et al. are employed herein to help describe the operation of the present invention.

BACKGROUND OF THE INVENTION (1) Field of the invention.—This invention relates to signaling in communication switching systems, and more particularly to trunk circuits and interoffice signaling by trunk circuits in telephone type communication systems.

(2) Description of the prior art.—When a switching system which handles both priority and non-priority calls is offered unusual traffic beyond its capacity, excessive delays may be caused to priority traffic unless priority can be indicated so as to allow preferential access to the system's common control equipment. One way this is accomplished in an originating office is to assign to those individual lines which originate priority calls a class mark which affords preferential access to the common control equipment. However, where an interoffice trunk is employed as a common carrier for both priority and non-priority calls, a fixed class mark assignment cannot be employed.

SUMMARY OF THE INVENTION

Briefly, the present invention employs interoffice trunk circuits which include apparatus for receiving signals indicative of the priority of an incoming call and for providing to an identifier circuit marks which indicate the priority of an incoming call. Each interoffice trunk has two sets of identifying conductors and appears to the identifier circuit as being in a first trunk group, for priority calls and in a second trunk group for non-priority calls. The appearances of all terminating units to the scanner circuits of the identifier are graded locally so that priority calls may be given preference over non-priority calls and so that local priority calls may be given preference over interoffice priority calls. The interoffice trunk circuits and their grading to the scanner of a switching center provide a priority rank within the switching center to incoming interoffice calls which have priority ranks in their own originating switching center.

BRIEF DESCRIPTION OF THE DRAWINGS

The invention, its arrangement, construction and operation will be better understood by reference to the following detailed description taken in conjunction with the accompanying drawings in which:

FIGS. 3–8, oriented as shown in FIG. 9, form a partial block, partial schematic diagram of an interoffice terminating unit, a switching matrix, a terminating unit identifier including a scanner, and other control circuits of a switch maker for serving interoffice calls;

FIG. 10 is a sequence chart of the operational states of a switch marker which may be employed with the present invention; and FIG. 11 is a single line block diagram of an alternative form of the invention wherein interoffice calls of a plurality of priorities may be served in the order of their priority.

DESCRIPTION OF THE PREFERRED EMBODIMENT

Figures 1, 2:
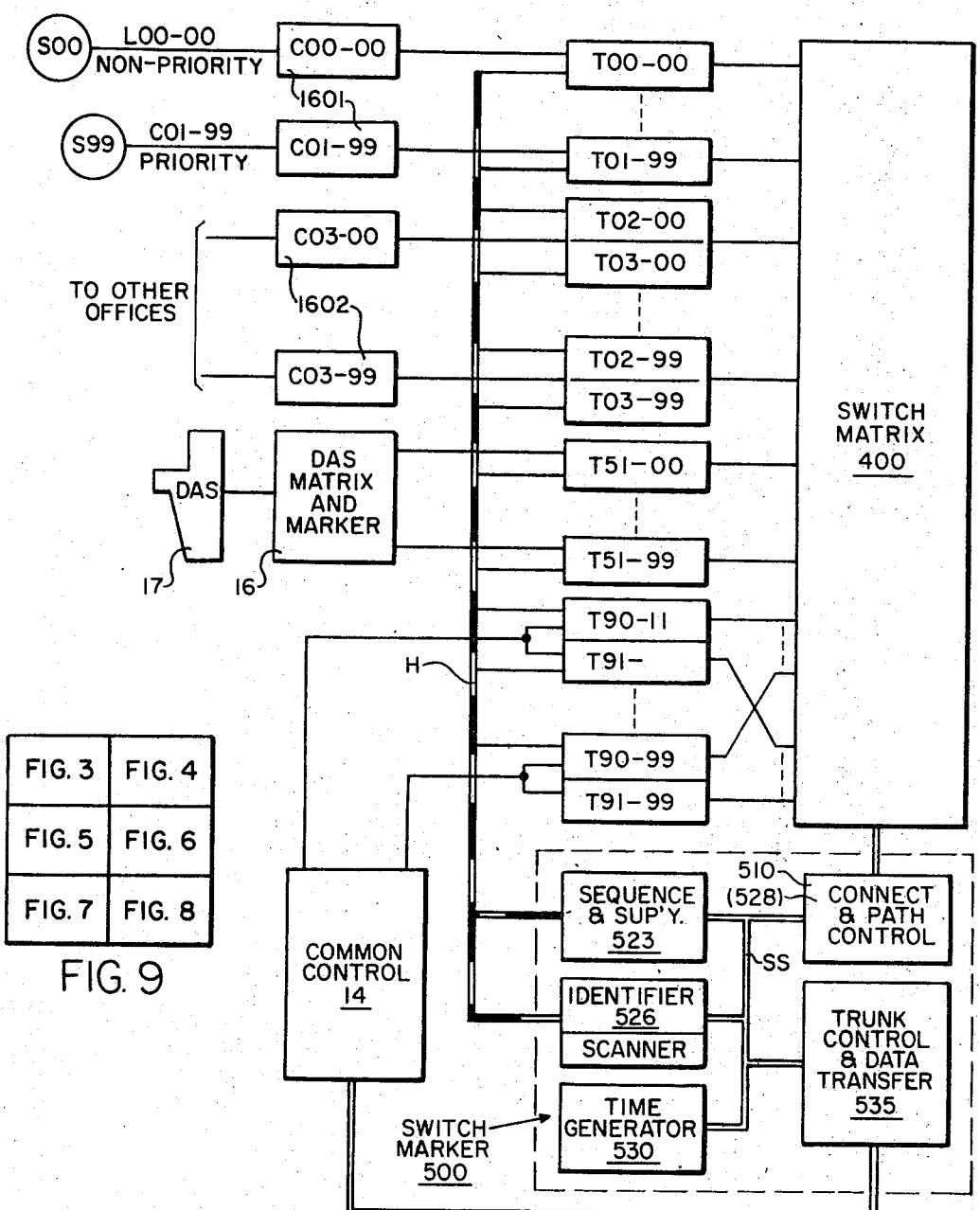
FIG. 1 is a single line block diagram showing a communication switching system in which a prority type call must be processed through more than one switching center.
FIG. 2 is a line block diagram which shows in more detail various portions of a switching center which receives both non-priority and priority interoffice calls and the application of the present invention to that switching center.

FIG. 1 shows a switching network comprising three switching centers which are interconnected by interoffice trunks IOT and transmission media T. Substation S1 of switching center #1 is a substation from which priority grade calls may be made. The substation is connected through switching center #1 to an outgoing interoffice trunk OGT, which is in turn linked to an incoming office trunk ICT of switching center #2. If switching center #2 is the terminating office, the call will progress to substation S2; however, if switching center #2 is determined to be a tandem office, the trunk ICT is connected to an outgoing trunk to progress the call to switching center #3. It can be seen from this simplified diagram that class marks to indicate that substation S1 is in a priority calling condition cannot be employed to signal the distant office without the provision of additional outside plant facilities to distinguish a priority call from a call which is not of a priority grade.

FIG. 2 shows a switching center which provides for a plurality of services. The office comprises a switch matrix 400 having terminating units T00–00 to T01–99; T02–00, T03–00 to T02–99, T03–99; T51–00 to T51–99; and T90–11, T91–11 to 90–99, 91–99.

The first two digits of the terminating units designate the trunk or terminating group while the second two digits designate the unit number within the group. For example, trunk group 00 is assigned to local lines which do not have a priority rank, trunk group 01 is assigned to local lines which have a priority rank, trunk groups 02 and 03 are assigned to interoffice trunks which carry priority and non-priority call, respectively, trunk group 15 is assigned to a dial assistance switchboard DAS and trunk groups 90, 91 are assigned to register-sender junctors in a manner set forth in Murphy et al.

All the terminating units of the switch matrix are of similar construction, with the exception of the priority identifying apparatus which is unique to the interoffice units and the trunk identity leads which are unique to each unit, therefore, all control leads are connected in multiple to a switch terminal control bus H, also referred to as a "highway." The highway connects the terminating units to the switch marker 500 which includes sequence and supervisory circuits 523, identifier 526, time generator 530, connect and path control circuits 510 (528) and trunk control and data transfer circuits 535. The various components of the switch marker are interconnected by connections SS. Logic circuits of the common control 14 control the operation of the switching center by serving the switch marker 500 over the data bus 320 to the trunk control and data transfer circuits 535.

Figure 3:
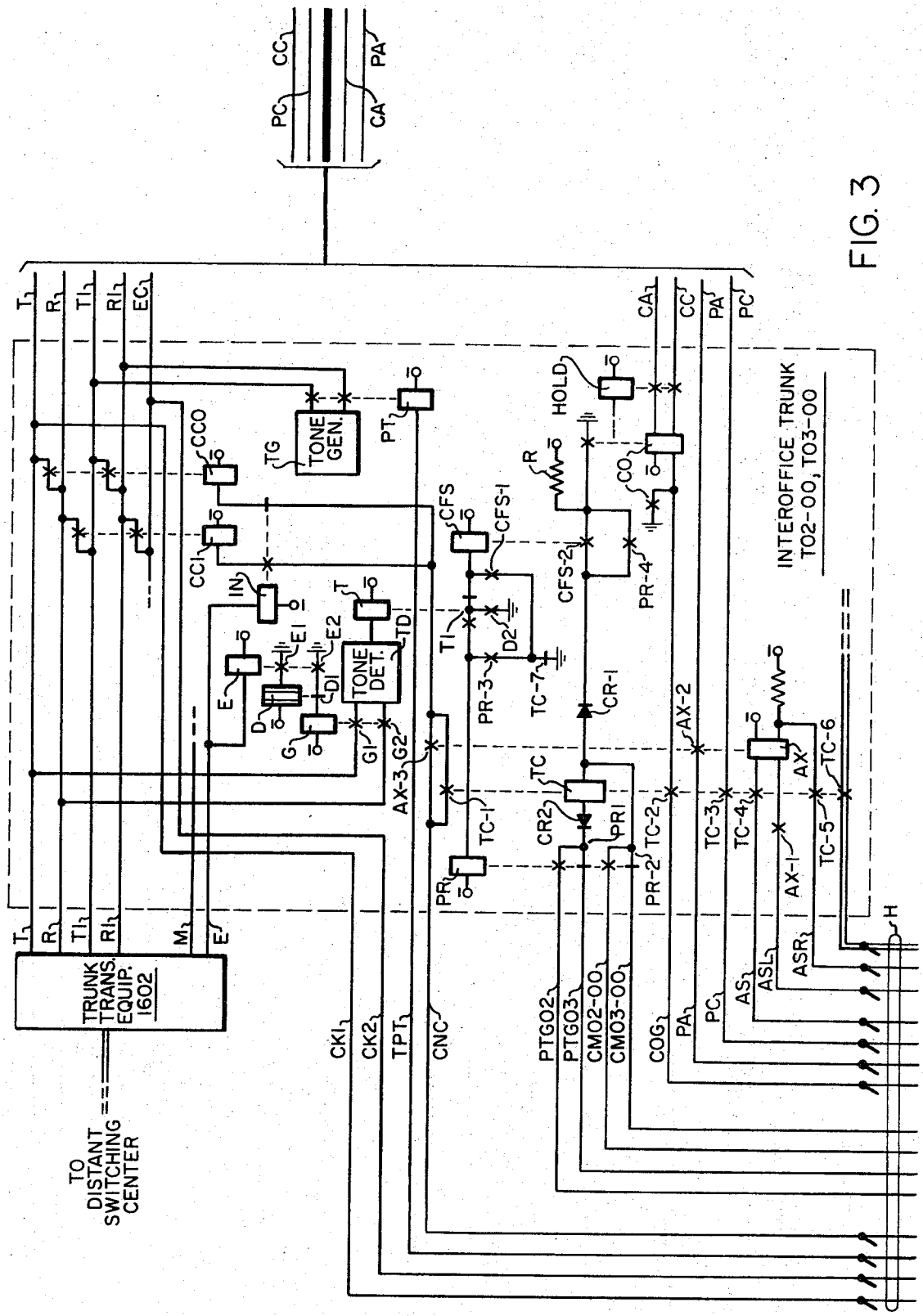
Figure 4:
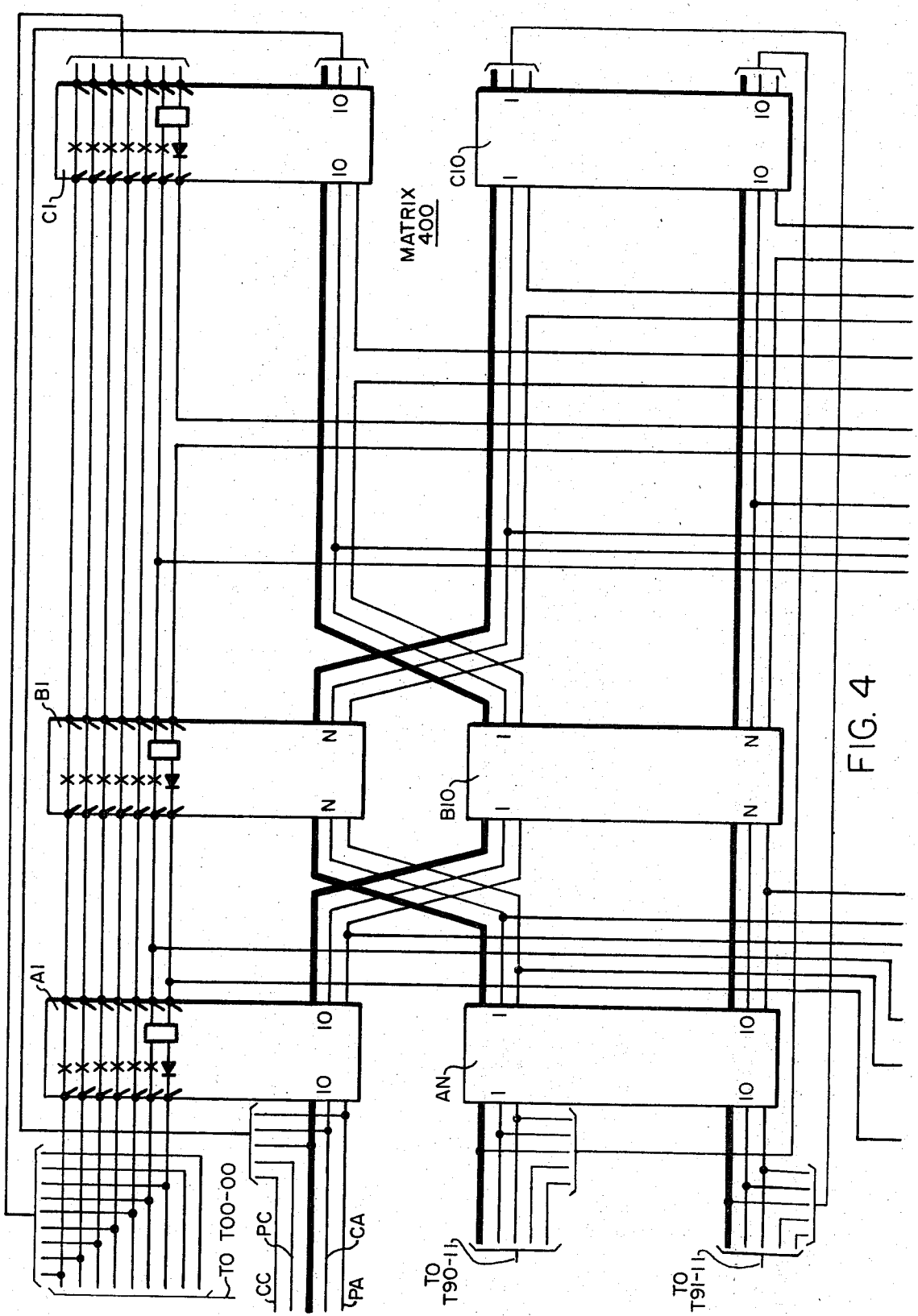

FIGS. 3-8 show interoffice trunk T02-00, T03-00 and its relation to the identifier 526. FIG. 3 shows a trunk circuit which is similar to trunk circuit T11-19 of the above-mentioned U.S. 3,328,534 with the exception that additional equipment has been provided for the determination of the priority status of a call and for indicating the priority status forward to another switching center. This additional equipment comprises relays E, D, G, T, PR and PT, as well as tone detector TD and tone generator TG. With the exception of the circuits just recited, which will be explained in detail below, the trunk circuit operates as in Murphy et al. The identifier of FIGS. 7 and 8 is similar to the identifier of Murphy et al., there being additional connections through highway H to provide the double trunk group appearance of the interoffice trunk and the control for forward signaling of a priority call.

Figure 5:
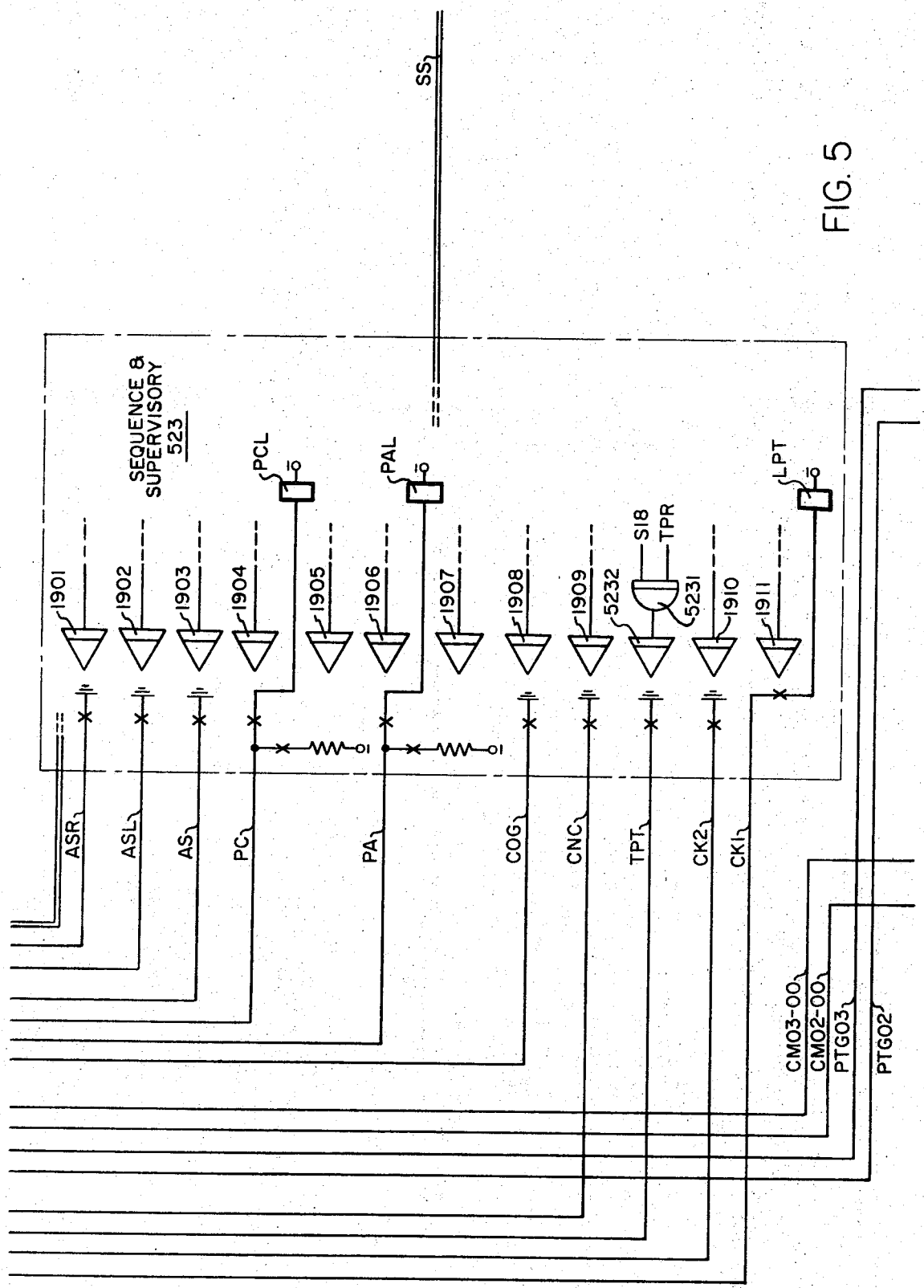

Included in FIG. 5 as a portion of the sequence and supervisory circuit 523 is a gating and driver arrangement which comprises a driver 5232 having an output TPT which extends to relay PT of FIG. 3 and an AND gate 5231 having two operational inputs which, as will be explained in the operational description below, control the forward signaling of an interoffice priority signal.

FIG. 10 is a sequence chart which is similar to the sequence chart of U.S. 3,328,534 and may be referred to in conjunction with detailed description of the present invention. The sequence chart has two main sections, namely an identity section and a matrix connection section, each of which includes time states for the operation of various equipment of the present invention.

FIG. 11 is a single line block diagram of trunk groupings wherein each trunk group has a non-priority and a priority appearance to the switch marker and wherein the priority is different for each group. Each of the combination trunk groups T02, T03 . . . , etc., are connected to incoming lines which are dedicated to a separate priority of the preceding switching center. For example, group 02 would identify the highest priority and 04 would identify the lowest of the priority ratings above routine or non-priority groups 05, 06 and 07. The trunk groups are connected to the identifier 526 according to their indicated priority and are also connected to the switch marker 400 as previously described.

DETAILED DESCRIPTION

Organization of trunks and trunk groups.—Referring to FIGS. 7 and 8, a sequence of trunk group identity and trunk identity inputs are shown for trunk groups TG00 to TG99 and trunks TK200 to TK99. The scanner comprises group tens scan circuits 2111, group units scan circuits 2112, trunk tens scan circuits 2211 and trunk units scan circuits 2212. It is important to note that the scanner operates to scan toward increasing trunk group numbers and is always reset after each service to trunk group 01 so that the priority of scan corresponds to the priority classification within the switching center, which in this example provides service for local priority lines first and then service to incoming priority calls. To decrease the total switching time, interoffice priority calls could be given preference over local priority calls by grading the priority appearances of the interoffice trunks to the first group of units to be scanned. The remainder of the trunk groups may be given priority grades within the switching center as is best suited to the switching center; however, the present example is chosen to provide third priority to interoffice non-priority calls so that the total switching time for the call will be shortened and fourth priority to local non-priority calls which require few switching functions when compared to interoffice calls. The above stated priority rating within the switching center has ignored the DAS and DAS matrix which as shown in the present example would receive a priority ranking just below interoffice non-priority calls; however, this DAS matrix could also have any desired priority.

Receiving a non-priority interoffice call.—Referring now to FIGS. 3-8 and 10, assume that a non-priority call is being received at the trunk transmission equipment 1602. An off-hook signal on the "E" lead causes relay E to operate and close its contacts E-1 and E-2 to supply ground to relays D and G. Relay G operates to connect the tone detector TD to the transmission lines T and R by way of contacts G-1 and G-2 for receipt of a priority tone. If no tone is present the tone detector cannot respond and relay T remains unoperated. Relay D, which is slow to operate, operates and opens the ground circuit to relay G at contacts D-1 to restore relay G and disconnect the tone detector from the lines T and R. Relay D also closes contacts D-2 to supply ground through contacts T-1 of unoperated relay T to operate relay CFS which is the non-priority call for service relay.

Relay CFS is provided a holding path through contacts TC-7 of relay TC and its own contacts CFS-1. A negative potential is extended by way of resistor R, contacts CFS-2 of relay CFS and diode CR1 through the unoperated contacts PR-2 of relay PR to conductor CM03-00 which extends via the highway H to the identifier 526 to initiate the marker cycle shown in FIG. 10.

The data transfer unit 535 of FIG. 8 includes 16 originating number flip-flops in groups of four, and each group of four is arranged to function as a counter for the four scanning units 2111, 2112, 2211 and 2212 of the scanner. In state S2 the first of these counters is enabled so that the group tens scan circuits 2111 can identify the tens digit of the trunk group number. The negative potential on conductor CM03-00 extends through diode CR6 to the lead TG03 and then through diode CR13 to the 0 input of scanner section 2111. When the counter in the transfer units 535 is in the 0 position it detects the calling potential and stops the counter so that the tens number is now recorded therein. Relay PG0 operates. The potential from lead TG03 is also extended through contacts of relay PG0 to the 3 input of the group units scanning circuits 2112. During state S3 the second counter in data transfer unit 535 is enabled and when it reaches the 3 position it detects the calling potential and stops the scan so that the units digit of the trunk group number is now recorded and relay RG3 (not shown) operates. The relays PG0 and RG3 from the 0 output of the unit 2111 and the 3 output of unit 2112 have now operated. The relay driver 2101 operates in response to a signal on lead APB from the sequence circuits to supply +16 volts potential to the break contacts of the PG and RG relays. Since relay PG0 is now operated, its break contacts are open and the potential extends only via the break contacts of the other nine relays PG1–PG9 via the diodes to 90 of the 100 TG leads, that is those not having the tens digit 0. Also, relay RG3 is operated and its break contacts are therefore open, so that the potential extends via the contacts only of the other nine relays RG1–RG9 to 90 out of the 100 TG leads having unit digits other than 3. Therefore, the positive potential is extended to all of the 100 TG leads except the ones having a tens digit 0 and a unit digit 3, that is all except lead TG03. Accordingly, all terminating units requesting service except those in trunk group TG03 will now be blanked out by the positive 16-volt potential.

During state S4 the counter in the data transfer unit 535 for the trunk tens scan circuits 2211 is enabled so that the potential on lead CM03–00 extends via diode CR24 to lead TK0 and through diode CR25 to the 0 input of the trunk tens scan unit 2211. When the count advances to the 0 position it is stopped and thus the tens digit of the trunk number is recorded causing operation of relay PT0. During state S5 the counter and data transfer unit 535 for the trunk units number is enabled and the potential on lead TK00 is now extended through the make contacts of relay PT0 to the 0 input of the trunk units scan circuits 2212. When the counter advances to the 0 position, it detects the calling potential and is stopped so that the trunk units number is now recorded and the output relay RT0 operates.

In state S6 the call for service signal is sent to the common control 14. Next in states S22 and S23 the originating number is transmitted via the data transmission path 320 to the common control equipment. In state S24 the register of the data transfer 535 unit is cleared.

The common control equipment now selects an idle register and during state S7 the orginating line number and the register number are received from common control via the data bus 320 into data transfer unit 535. The orginating number is recorded in the 16 flip-flops for the originating number and the register number is recorded in another 16 flip-flops for the terminating number. In the normal marker cycle the terminating number is supplied via gates to the four scan units 2111, 2112, 2211 and 2212 to operate one output relay from each. Assuming that the common control has selected register sender-junctor having the terminating number T90–11 so that relays PG9, RG0, PT1 and RT1 are now operated. The signal PTC from the sequence circuit is true so that relay drivers 2103 and 2203 are now operated. Negative potential extends via resistor R1 contacts of relay driver 2103, contacts of relay PG9, contacts of relay RG0 to lead PTG11 to one side of the TC relay of terminal T90–11, (reference may be taken to FIG. 3) and ground potential extends via contacts of relay RT1, diode CR36, contacts of relay PT1 to lead TK11, and then via the control path H (TK leads in Murphy et al.) to the other side of the TC relay of terminal T90–11 causing it to operate. The sequence circuits next supplies signals to operate and lock the AX relay of terminal T90–11. The relay DPC is then operated to restore the scanner output relays. The originating number is now supplied via the scan units to operate relays PG0, RG3, PT0 and RT0 (terminating unit T03–00). This causes negative potential to be supplied via lead PTG00, and ground potentials via lead CM03–00 to operate the TC relay of terminating unit T03–00. Contacts TC–1 to TC–6 connect the unit to the matrix and prepare the loop for checking. Contacts TC–7 open to remove the call for service marks from the identifier leads. The path control circuit 510 (528) is then enabled to select a path and establish connection from the C appearance of the calling terminating unit T03–00 to the A appearance of the receiving terminating unit T90–11. The marker is then released and is available to serve other calls.

After the marker is released, the receiving terminal unit of the register junctor and the register sender of the common control 14 are available to receive calling signals. After the common control has determined the route and selected an outgoing trunk, it again seizes the switch marker and, via the data transmission path 320, supplies the sender number and the outgoing trunk number to the data transfer unit 535. A connection is then established in the same manner as for the connection to the receiving terminal, this time the connection extending from the sending terminal T91–11 via the switch matrix to the terminating unit T03–99.

Receiving a priority interoffice call.—Still referring to FIGS. 3–8 and 10, assume now that a priority call is being received at the trunk tranmission equipment 1602. Again and off-hook signal on the "E" lead causes relay E to operate and closes contacts E–1 and E–2 to supply ground to relays D and G. Relay G operates contacts G–1 and G–2 to connect the tone detector TD to the transmission lines T and R for receipt of a priroity tone, If a priority tone is present the tone detector responds and operates relay T. Relay D operates to disconnect the tone detector from the T and R leads by opening contacts D–1 to gating relay G; however, relay D contacts D–2 extend ground through the transfer contacts T–1 of relay T to operate relay PR which has a holding ground supplied via contacts TC–7 of relay TC and contacts PR–3. A negative potential is placed on lead CM02–00 through resistor R, contacts PR–4, diode CR1, and the operated transfer contacts PR–2.

The circuits now operate as just described for a non-priority call with the exception that the calls for service marks indicate a different priority trunk group for the same interoffice trunk circuit.

Forward extension of the call.—After the common control has determined that the connection is switching center #1 should be switched, through, the common control again seizes the switch marker 500. The connections from the calling line to the receiving terminal and the connection from the sending terminal to the outgoing trunk are released, and the originating line number and the outgoing trunk number are supplied via the data transmission path 320 to the data transfer unit 535. The outgoing trunk number is first supplied to the scan units to operate relays PG0, RG3, PT9 and RT9, assuming that trunk T03–99 is the selected outgoing trunk. The signal PTC then becomes true to operate relay drivers 2103 and 2203 so that the potentials are extended via the highway H to operate TC of the terminating unit T03–99. Then relay driver 1903 is operated in the sequence and supervisory circuits 523 to extend ground potential via lead AS to operate relay AX. Ground potential via the contacts of another relay driver 1902 of unit 523 and lead ASL is extended via highway H and contacts of AX–1 to lock relay AX. Relay DPC is then operated to release the output relays of the scan units thereby releasing the TC relay of the outgoing trunk. The originating number is applied to the scan units to operate GP0, RG3, PT0, and RT0 so that the TC relay of the incoming terminating unit T03–00 is operated. The sequence circuits now supply negative potential via lead PA and contacts AX–2 of relay AX of terminating unit T03–99 onto the A appearance on the matrix, via a diode and operate winding of a crosspoint relay in the matrix 400, and then via conductor DRA into the marker to operate relay ALK1 via ground at contacts of operated relay driver 2074. Also negative potential extends from the sequence and supervisory circuits to lead TC, via the control bus H and contacts of the TC relay of terminating unit T03–00 to the C appearance on the switch matrix, and then via the operate winding and diode of crosspoint relay, and the conductor DRC into the marker to operate relay CLK1 through the ground via contacts of the operated relay driver 2075. Relay PM1 operates via ground through contacts of relay CLK1. Testing paths from the C leads now extend from the AB links of the matrix A1 via contacts of relay ALK1 to a scanner and from the BC links of matrix C1 via the contacts of relay CLK1 (PM1) to the scanner. After checking the continuity through the link testing resistors from the contacts of relays AT and CT, counter 2000 is enabled from the sequence circuit via gate 2092 to scan the paths. Upon finding coincidence of an idle AB link, an idle BC link, and the step of counter 2000, the signal from one of the ten AND gates 2001 to 2010 will become true, supplying a signal via gate 2091 to inhibit gate 2092 and thereby stop the counter 2000. Assuming that the path selected is the one corresponding to gate 2001, the relay driver supplies ground potential to operate the relay P1. During state S18 a relay driver 2018 is operated to supply ground potential via contacts of relay P1 and contacts of relay PM1 to the pull conductors of the selected path. This potential extends in one direction through the B and A stages to the PA lead via the outgoing trunk terminating unit T03-99 and contacts of the AX relay therein to negative potential in the sequence and supervisory circuits 523 to operate those two stages. The pull potential in the other direction extends via the crosspoint in the C stage to the PC lead in the calling line terminating unit T03-00 and via contacts of relay TC therein over the common highway H to the sequence and supervisory circuits to operate the crosspoint in the C stage. The cutoff relays in the two terminating units will then operate via the path over the C leads through the three stages of the matrix and the marker is released.

Forward extension of a priority interoffice call.—Upon seizing the forward loop in state S18, gate 5231 and driver 5232 of the supervisory and control circuits 523 are enabled to extend a ground over lead TPT to operate relay PT in the outgoing trunk T03-99 to momentarily place tone generator TG on the transmitting terminal of the trunk circuit to forward a priority signal to an interoffice trunk of the next switching center.

Alternate embodiment.—FIG. 11 shows an alternate embodiment of the invention which operates substantially as described above. The switching system according to FIG. 11, however, provides preferential service based not only on priority, but on grade or rank of priority. Each group of incoming lines are dedicated to a separate priority of the preceding switching center and are graded to the scanner of identifier 526 according to that priority. As before, it may be most practical to assign trunk group 01 to local priority lines and provide local priority calls with first access to the common control. In such case group 02 would serve the highest incoming priority calls and group 04 the lowest incoming priority calls with groups 05, 06 and 07 being routine or non-priority service.

Although the invention has been described by specific illustrations and by reference to specific environments, various other modifications may be made by one skilled in the art without departing from the spirit and scope of the invention as defined in the appended claims.

What is claimed is:

1. A communication switching center, a first group of communication lines, each of said lines connecting a station dedicated for local priority calls and arranged for applying a first call for service signal to said line when in a calling condition, a first group of terminating units individually connected to said first group of lines, a second group of communication lines, each of said second group of lines connecting another center arranged for applying a first call for service signal when in a non-priority calling condition and a second call for service signal when in a priority calling condition, a second group of terminating units individually connected to said second group of lines, a third group of communication lines, each of said third group of lines connecting a station dedicated for local non-priority calls and arranged for applying a first call for service signal to an associated one of said lines when in a calling condition, a third group of terminating units individually connected to said third group of lines, a switching matrix connected to said first, second and third group of terminating units, each terminating unit of said first, second and third groups including a first output circuit and first means operable in response to a first call for service signal to provide call for service marks to its first output circuit, each terminating unit of said second group also including a second output circuit and second means operable in response to a second call for service signal to provide a call for service mark to its second output circuit, said second output circuits appearing as a fourth group of terminating units, a plurality of register-junctors connected to said matrix, a switch marker connected to said matrix for controlling connections therethrough between calling lines and idle ones of said register-junctors, and control apparatus including a plurality of registers associated with said plurality of register-junctors, said control apparatus being connected to said marker and operable to provide the identity of idle registers to said marker, said marker including a terminating unit identifier having a scanner for scanning said first and second outputs for call for service marks, said scanner connected to said first and second output circuits in a predetermined order of priority of groups and operable after serving each call for service to start each scan with the highest order group, a priority schedule being thereby provided for serving incoming interoffice priority calls before non-priority calls.

2. A communication switching center including a plurality of communication lies, each of said lines connecting terminal equipment arranged for applying a first call for service signal to said line when in a calling condition, at least one of said lines connecting terminal equipment arranged for also applying a second signal to said line when in a calling condition, said first signal indicating a first priority level and said first and second signals together indicating a second priority level of a call to be carried by said one line, a switching network, common control apparatus for controlling the progress of calls through said center, a switch marker for controlling access to said common control apparatus and the establishment of connections through said network, and an interoffice trunk circuit connected to said one line, to said network and to said marker for providing to said marker indications of the priority level of an interoffice call in response to said signals, whereby said marker provides said trunk circuit preferential access to said common control apparatus for calls of a first priority level, said trunk circuit comprising: a plurality of input circuits coupled to said one line for receiving said first and second signals; first and second output circuits connected to said switch marker; a first signal receiver connected to a first of said input circuits and operable in response to said first signal; first marking means connected between said first signal receiver and said first output circuit, said first marking means being operated by said first signal receiver to mark said first output circuit to indicate a first priority level; a second signal receiver connected to a second of said input circuits and to said first signal receiver, said second signal receiver connected to said second of said input circuits by said first signal receiver and operated by said second signal; and second marking means connected between said second signal receiver and said second output circuit, said second marking means being operated by said second signal receiver to mark said second output circuit to indicate a second priority level.

3. A communication center as set forth in claim 2, wherein said first and second signals comprise tone signals and said second signal receiver comprises a tone detector.

4. A communication switching center as set forth in claim 2, and further comprising a signal generator in said interoffice trunk circuit, a control input circuit connected to said marker for receiving an outgoing priority control signal from said marker, and means connected between said generator and said one line and connected to said control input circuit, said means being responsive to said outgoing priority control signal for connecting said signal generator to said one line.

5. A communication switching center as set forth in claim 2, wherein said first signal receiver in said trunk circuit comprises a first switch and a means operated responsive to receipt of said first signal for operating said first switch, and a time delay switch connected between said first switch and said first marking means to delay the operation of said first marking means.

6. A communication switching center as set forth in claim 2, wherein said second signal receiver in said trunk circuit comprises an enabling switch connected to and operated by said first signal receiver, a signal receiving switch operable in response to said second signal and an operate-inhibit switch connected between said signal receiving switch and said first and second marking means, said operate-inhibit switch being operated by said signal receiving switch to operate said second marking means and inhibit operation of said first marking means.

7. A communication switching center as set forth in claim 2, wherein said first signal receiver in said trunk circuit comprises a first relay operated by said first signal and a second slow acting relay having an operating delay time said second relay being connected to and operated by said first relay, said first marking means comprising a third relay connected to said first output circuit and connected to and operated by said second slow acting relay after the operating time delay thereof, said second signal receiver comprising a fourth relay connected to and operated by said first relay, a signal detector connected to said fourth relay and to said second input circuit via said fourth relay and operated by said second signal, a fifth relay connected to and operated by said signal detector, and said second marking means comprising a sixth relay connected to said second output circuit and connected to and operated by said fifth relay to indicate a second priority level.

8. A communication switching center as set forth in claim 7, wherein said fourth relay of said trunk circuit is further connected to said second relay and released thereby after the operate time delay thereof upon the operation of said second relay.

9. A communication switching system comprising: a plurality of groups of interoffice lines, each of said lines capable of carrying non-priority calls and calls having a priority rank which is different from priority ranks of lines in others of said groups, a switching network, a switch marker connected to said network for establishing connections therethrough, common logic circuits connected to and controlling said switch marker, a plurality of groups of terminating units connected to said switching network, the individual terminating units of each group connected to separate lines of a separate group of lines, each terminating unit serving as a common carrier for priority and non-priority calls and each group being therefore associated with priority calls of a separate rank and with non-priority calls, means for applying priority signals and non-priority signals to calling ones of said lines, means in each of said terminating units for generating priority and non-priority call for service marks in response to the receipt of priority and non-priority signals, respectively, an identifier in said switch marker including a scanner having a connection to each of said terminating units for controlling access of said terminating units to said common logic circuits, said scanner operating to scan said groups of terminating units for said call for service marks and resetting after each call for service, and circuit connections from said terminating units to said scanner for carrying said call for service marks, the circuit connections to said scanner being in the order of highest priority rank terminating units to lowest priority rank terminating units followed by the non-priority appearance of the terminating units with respect to the beginning of the scan.

10. A communication switching center including a plurality of communication lines, each of said lines connecting terminal equipment arranged for applying a first call for service signal to an associated one of said lines when in a calling condition, at least one of said lines connecting terminal equipment arranged for also applying a second signal to said line when in a calling condition, said first signal indicating a first priority level and said first and second signals together indicating a second priority level of a call to be carried by said one line, a switching network, common control apparatus for controlling the progress of calls through said center, a switch marker for controlling access to said common control apparatus and the establishment of connections through said network, and an interoffice trunk circuit connected to said one line, to said network and to said marker for providing to said marker indications of the priority level of an interoffice call in response to said signals, whereby said marker provides said trunk circuit preferential access to said common control apparatus for calls of a first priority level, said trunk circuit comprising: first and second output terminals connected to said switch marker; first and second signal receivers coupled to said one line and operated by said first and second signals, respectively; and marking means connected to said first and second signal receivers and to said first and second output terminals for selectively marking said first and second output terminals to indicate the priority level of an incoming call in response to the operation of said first and second signal receivers.

11. A communication switching center according to claim 10, wherein said interoffice trunk circuit marking means comprises a source of marking potential which is connectable to said first and second output terminals and a priority control circuit connected between said source and said first and second output terminals, said priority control circuit being further connected to and operated by said first and second signal receivers to selectively connect said source of marking potential to said first and second output terminals.

References Cited

UNITED STATES PATENTS 2,911,477  11/1959  Gohorel et al.

KATHLEEN H. CLAFFY, Primary Examiner

T. W. BROWN, Assistant Examiner